J. T. MASON.
AUTOMATIC NEST BOX.
APPLICATION FILED AUG. 13, 1912.
1,068,794.
Patented July 29, 1913.
2 SHEETS—SHEET 1.
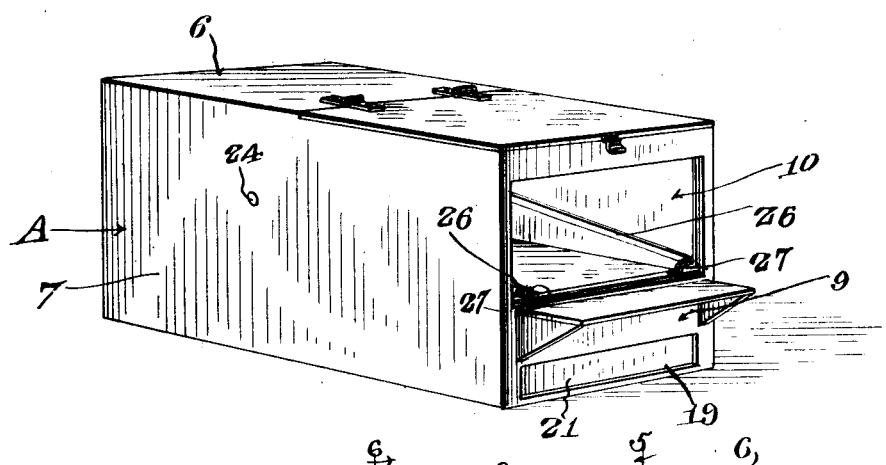
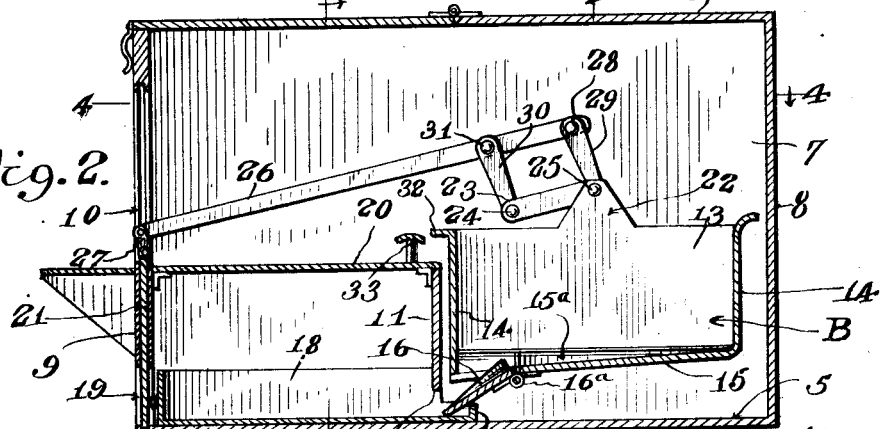
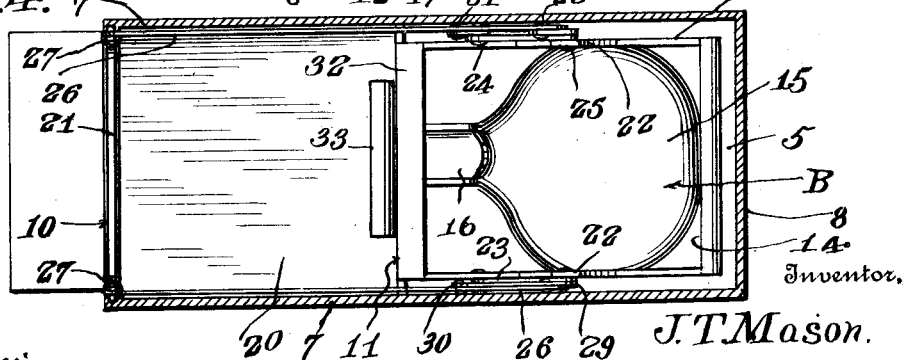
Witnesses:
Inventor,
J. T. Mason.
By
Attorneys

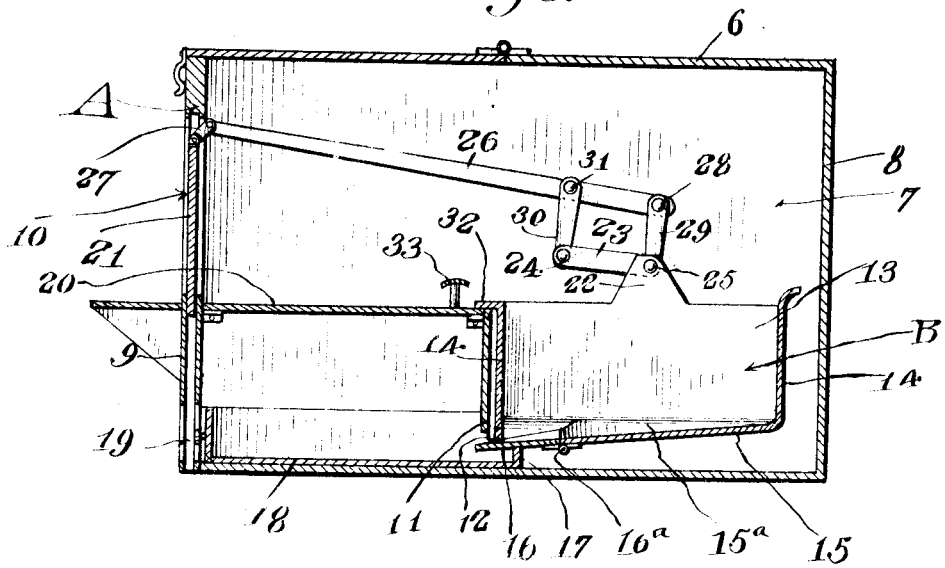
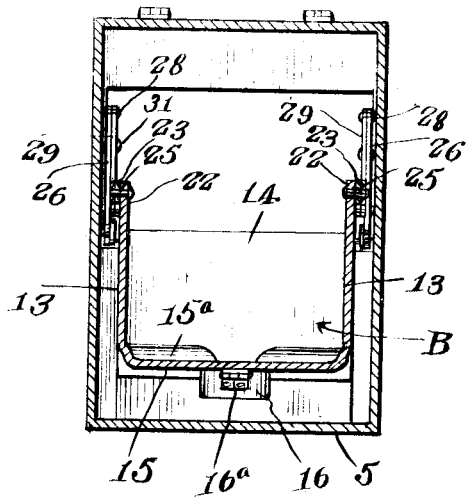
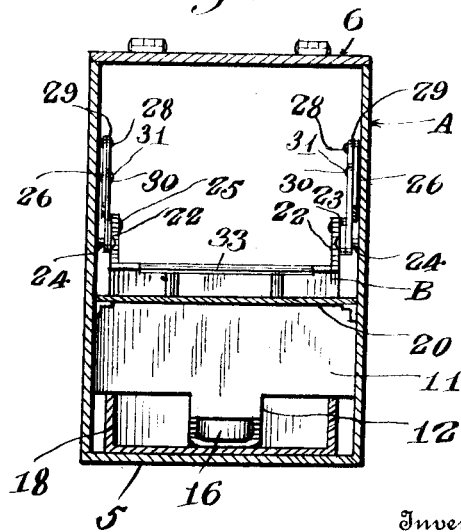

UNITED STATES PATENT OFFICE.

JOHN T. MASON, OF KEWANEE, ILLINOIS.

AUTOMATIC NEST-BOX.

1,068,704.   Specification of Letters Patent.   Patented July 29, 1913.

Application filed August 13, 1912. Serial No. 714,883.

*To all whom it may concern:*

Be it known that I, JOHN T. MASON, a citizen of the United States, residing at Kewanee, in the county of Henry, State of Illinois, have invented certain new and useful Improvements in Automatic Nest-Boxes; and I do hereby declare the following to be a full, clear, and exact description of the invention, such as will enable others skilled in the art to which it appertains to make and use the same.

This invention relates to improvements in automatic nest boxes for hens.

The principal object of the invention is to provide a nest which is mounted within a box, and is adapted when occupied by a hen to automatically close the door of the box and thereby prevent the intrusion of other fowls, mice or the like.

Another object of the invention is to provide a nest of the character described, which is provided with a novel means for automatically discharging an egg into a receptacle immediately upon the hen leaving the nest.

A further object of the invention is to provide a nest box of the character described which is extremely simple in construction, it being composed of a minimum number of parts, and is therefore cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a perspective view of a nest box constructed in accordance with my invention, Fig. 2 is a longitudinal sectional view therethrough showing the nest in its normal position, Fig. 3 is a similar view but showing the machine in its gravitated position, Fig. 4 is a horizontal sectional view taken on the line 4—4 of Fig. 2, Fig. 5 is a transverse sectional view taken on the line 5—5 of Fig. 2, and Fig. 6 is a transverse sectional view taken on the line 6—6 of Fig. 3.

Like reference numerals designate corresponding parts in all the figures of the drawings.

Referring to the drawings, A designates a box which is preferably formed from sheet metal, such as galvanized iron or the like, although any other material may be employed if so desired. This box includes a bottom 5, a top 6, side walls 7—7, a rear end wall 8 and a front end wall 9, the latter being centrally formed with a transverse opening 10 for permitting a hen to enter the box. Centrally disposed within the box is a transverse partition 11, said partition being centrally formed at its lower end with an opening 12.

Disposed within the box between the partition 11 and the rear wall 8 is a nest B, which includes side walls 13—13, end walls 14—14 and a bottom 15, the latter being formed with a trough 15ª, which inclines downwardly toward the front end of the nest. The forward end of the bottom is centrally formed with a closure 16, said closure being hingedly connected, as at 16ª, to permit of the same swinging downwardly. In the normal position of the nest, as shown in Fig. 2 of the drawings, the closure 16 rests upon the rear end wall 17 of a forwardly sliding tray 18, said tray being adapted to be withdrawn from the box through an opening 19 formed in the front wall 9 below the entrance opening 10.

A horizontal partition 20 is disposed above the tray 18, and is supported by the side walls 7 of the box. This partition is disposed between the vertical partition 11 and the front wall 9, and has its front edge spaced from said front wall to provide room for a vertically movable door 21 which is adapted when the nest is in gravitated position to close the entrance opening 10 of the box, as is clearly shown in Fig. 2 of the drawings.

Centrally extending upwardly from the side walls 13 of the nest B are projections 22—22. A short link 23 is pivotally connected at one end, as at 24, to the adjacent side wall 7 of the box, and at its other end, as at 25, to the projection 22. Equalizing levers 26 are each disposed upon opposite sides of the box, and each lever is pivotally connected to the door 21 by a hinge 27. This lever is disposed in a plane parallel to the link 23. The rear end of the lever is pivotally connected, as at 28, to one end of a link 29, the other end of said link being secured to the projection by the pivot 25 above described. A second link 30, which is disposed in parallel relation to the link 29, is connected at one end, as at 31, to the lever 26 and has its other end pivotally connected to the pivot 24 above described.

In operation, the door 21 is normally open and the nest B is normally in an elevated position, as is clearly shown in Fig. 2 of the drawings. When a hen enters the box through the opening 10 she alights in the nest B and simultaneously raises the door 21 to close the entrance opening 10, and thereby prevent other hens, mice or the like from entering the nest. As the nest is thus lowered, the closure 16 is shifted to close the trough 15$^a$. As soon as the hen leaves the nest B, the door 21 will drop by gravity and uncover the entrance opening 10 and simultaneously elevate the nest B. As the nest is thus elevated, the closure 16 is caused to assume a downwardly inclined position, as is clearly shown in Fig. 3 of the drawings. As a result, the egg can readily pass from the chute 15$^a$ along the closure 16 and into the tray 18. This tray can be subsequently removed from the box as soon as the door 21 is manually lifted to uncover the opening 19.

The upper edge of the front wall 14 of the nest B is formed with a forwardly extending lip 32 which is adapted when the nest is in its gravitated position to engage upon the horizontal partition 20, and thereby prevent the nest from further movement.

Supported on the horizontal partition 20 and slightly in advance of the nest B is a transversely disposed step 33 upon which a hen may step when leaving the nest.

What is claimed is:

The combination with a box having an opening, of a gravity door normally disposed below the opening, a gravity nest arranged within the box, the bottom of the nest being formed with an egg discharge opening, a removable tray mounted in the box, and a downwardly and forwardly inclined trough leading to said opening, a closure hingedly connected adjacent the discharge opening and adapted to close the same when said closure contacts with the tray and the nest is in its lowered position and to disengage the discharge opening when the nest is elevated, said closure serving to permit eggs to pass thereover when said nest is in its lowered position, means connecting the door and nest for alternately raising and lowering the same, said means comprising a short link pivotally connected at one end to the box and at its other end to the nest, an equalizing lever disposed in a plane parallel to the link and pivotally connected at one end to the door, spaced links each pivotally connected at one end to a respective end of the first mentioned link and at its other end to the equalizing lever.

In testimony whereof, I affix my signature, in presence of two witnesses.

JOHN T. MASON.

Witnesses:
ALEX. McLEAN,
ELIJAH FAULL.